(12) United States Patent
Schussmann et al.

(10) Patent No.: US 9,701,280 B2
(45) Date of Patent: Jul. 11, 2017

(54) REVOCATION OF MOBILE DEVICE COMMUNICATION CONTROL PRIVILEGES

(71) Applicant: GM Global Technology Operations LLC, Detroit, MI (US)

(72) Inventors: Jennifer J. Schussmann, Whitby (CA); Karl B. Leboeuf, Windsor (CA); Lynn Saxton, Los Alamos, NM (US); Alessandro Testa, White Rock, NM (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/678,090

(22) Filed: Apr. 3, 2015

(65) Prior Publication Data

US 2016/0295005 A1    Oct. 6, 2016

(51) Int. Cl.

| | |
|---|---|
| H04M 3/16 | (2006.01) |
| B60R 25/20 | (2013.01) |
| H04B 1/3822 | (2015.01) |
| H04W 4/00 | (2009.01) |
| H04L 29/08 | (2006.01) |
| H04M 1/725 | (2006.01) |
| B60R 25/24 | (2013.01) |
| H04W 12/08 | (2009.01) |

(52) U.S. Cl.
CPC .......... *B60R 25/209* (2013.01); *B60R 25/241* (2013.01); *H04B 1/3822* (2013.01); *H04L 67/306* (2013.01); *H04M 1/72533* (2013.01); *H04W 4/005* (2013.01); *H04W 4/008* (2013.01); *H04W 12/08* (2013.01)

(58) Field of Classification Search
CPC ... H04W 12/04; H04W 12/06; H04W 12/008; H04W 12/10; H04W 12/12; H04W 12/02; H04W 12/08; H04W 4/005; H04W 4/008; H04W 4/006
USPC .......... 455/410, 411, 414.1, 414.2, 420, 421, 455/419
See application file for complete search history.

(56) References Cited

U.S. PATENT DOCUMENTS

| | | | |
|---|---|---|---|
| 9,110,774 B1* | 8/2015 | Bonn | G06F 17/00 |
| 9,111,214 B1* | 8/2015 | Sharma | G06N 3/006 |
| 9,276,743 B2* | 3/2016 | Cordeiro De Oliveira Barros | H04L 9/14 |
| 2009/0113543 A1* | 4/2009 | Adams | H04L 9/3271 726/18 |
| 2011/0213968 A1* | 9/2011 | Zhang | H04L 63/20 713/158 |
| 2013/0340049 A1* | 12/2013 | Adams | H04L 63/105 726/4 |

(Continued)

*Primary Examiner* — Jean Gelin
(74) *Attorney, Agent, or Firm* — Christopher DeVries; Reising Ethington P.C.

(57) ABSTRACT

A mobile communication system that includes a vehicle and a mobile device is provided. The method pertains to revoking communication control privileges of the mobile device previously authorized to control the vehicle. The method includes the steps of receiving a revocation request at the vehicle via a user interface device, the revocation request including a request to revoke the communication control privileges of the previously authorized mobile device, wherein the control privileges includes a capacity to remotely command at least one of a plurality of vehicle functions; and based on the revocation request, revoking at the vehicle the communication control privileges of the previously authorized mobile device.

13 Claims, 4 Drawing Sheets

(56) References Cited

U.S. PATENT DOCUMENTS

2015/0227903 A1\* 8/2015 Votaw ................ G06Q 20/108
705/42
2016/0055699 A1\* 2/2016 Vincenti ............ G07C 9/00309
340/5.61

\* cited by examiner

REVOCATION OF MOBILE DEVICE COMMUNICATION CONTROL PRIVILEGES

TECHNICAL FIELD

The present invention relates to revocation of communication control privileges of a mobile device previously authorized to control at least one vehicle function.

BACKGROUND

By using a smart phone and a wireless protocol, vehicle users may remotely command the execution or performance of various vehicle tasks. For example, using the smart phone and a short range wireless protocol, a vehicle user may unlock the vehicle doors or start the vehicle without entering or otherwise interacting with the vehicle. Or using the smart phone and a cellular protocol, the vehicle user may perform these or similar tasks remotely such as from within a shopping mall while the vehicle is in a nearby parking garage. In some instances, the smart phone may be equipped with secure application software that may enable secure communications between it and a telematics backend so that commands sent from the smart phone may be validated at the backend and then cellularly transmitted to the vehicle. The vehicle, in response to receiving this communication from the backend, may then perform the desired task.

SUMMARY

According to one embodiment of the invention, there is provided a method of revoking communication control privileges of a mobile device previously authorized to control a vehicle. The method includes the steps of receiving a revocation request at the vehicle via a user interface device, the revocation request comprising a request to revoke the communication control privileges of the previously authorized mobile device, wherein the control privileges includes a capacity to remotely command at least one of a plurality of vehicle functions; and based on the revocation request, revoking at the vehicle the communication control privileges of the previously authorized mobile device.

According to another embodiment of the invention, there is provided a method of revoking communication control privileges of a mobile device previously authorized to control a vehicle. The method includes the steps of monitoring for receipt of a trigger associated with a revocation test event, wherein the trigger is in response to a quantifier in the vehicle determining a threshold value; when the trigger is received, presenting a query to a vehicle user via a user interface device, the query requesting an authentication code; and when the authentication code is not received, then revoking the communication control privileges of the mobile device.

According to another embodiment of the invention, there is provided a method of revoking vehicle communication control privileges of a mobile device. The method includes the steps of operating electronic subsystems in a vehicle that each control at least one of a plurality of vehicle functions, wherein the plurality of vehicle functions include at least one or more of the following: electronically-activated door locks, electronically-activated vehicle ignition, and an electronically-activated trunk release; receiving, at the vehicle directly from a mobile device, a vehicle function command from the mobile device while the mobile device is present at the vehicle, wherein the vehicle function command comprises a request for the vehicle to carry out one of the vehicle functions, and wherein the vehicle includes an authorization setting indicating that the mobile device is authorized to command the vehicle to carry out one or more of the plurality of vehicle functions including the requested vehicle function; carrying out the requested vehicle function; and then subsequently: receiving at the vehicle a revocation request indicating that the mobile device is no longer authorized to carry out the one or more vehicle functions; and in response to receipt of the revocation request, changing the authorization setting in the vehicle so that the mobile device is no longer authorized to command the vehicle to carry out the one or more vehicle functions.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Communications System—

The communication system and methods described below pertain to a mobile device that has been granted authorization or privilege to control one or more functions of a vehicle. The number of vehicle functions that may be controlled by a mobile device are virtually as numerous as those that may be controlled by a user within the vehicle or autonomously by the vehicle itself. A few examples of controllable functions by a mobile device include electronic vehicle ignition, electronic actuation of vehicle door locks, and electronic actuation of a vehicle trunk release.

Figure 1:
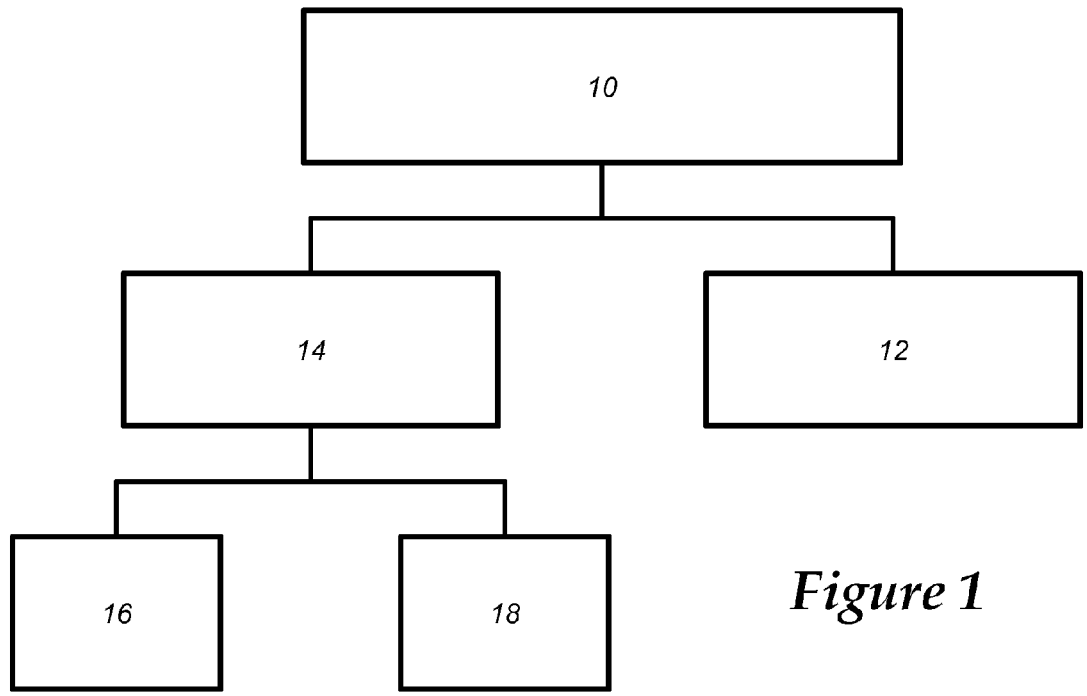
FIG. 1 is a flowchart illustrating methods of active and passive revocation of vehicle communication control privileges (CCP) of a mobile device.

The system and methods described herein more specifically pertain to revoking the previously granted authorization. As will be apparent in the description below, the ability to revoke the communication and control privileges of the mobile device may enhance vehicle security in the event the mobile device is lost or stolen, or even impede a criminal in the event the car is stolen. FIG. 1 illustrates that revoking a mobile device's communication control privileges 10 may occur via passive revocation 12 or active revocation 14. Passive revocation may be without user-interaction—e.g., without human actuation or initiation where the user provides input by depressing a switch, touching a screen, or using voice commands. Thus, passive revocation may be an automated process carried out by vehicle electronics, hardware, software, etc. without human interaction. In at least one embodiment, however, passive revocation may be initiated by or otherwise include limited input by the user (e.g., of a threshold value) prior to initiating a monitoring period;

and once monitoring begins, the process is fully automated (i.e., without human interaction).

In active revocation implementations, the revocation may require user-interaction or human input to revoke communication control privileges. The user's interaction may take various forms, as will be discussed more below. One example of user-interaction includes the user providing input to a vehicle head unit (e.g., via a touch screen, a switch or button, or via a voice command or instruction), and in response to the user-interaction, revocation of communication control privileges are revoked. Other examples are discussed in greater detail below. Furthermore, active revocation 14 may include situations where user-interaction is local or proximate to the vehicle 16 or where the user-interaction is remote from the vehicle 18. Regardless of whether the revocation is active or passive, revoking the previously granted authorization from the mobile device may enhance vehicle security.

Figure 2:
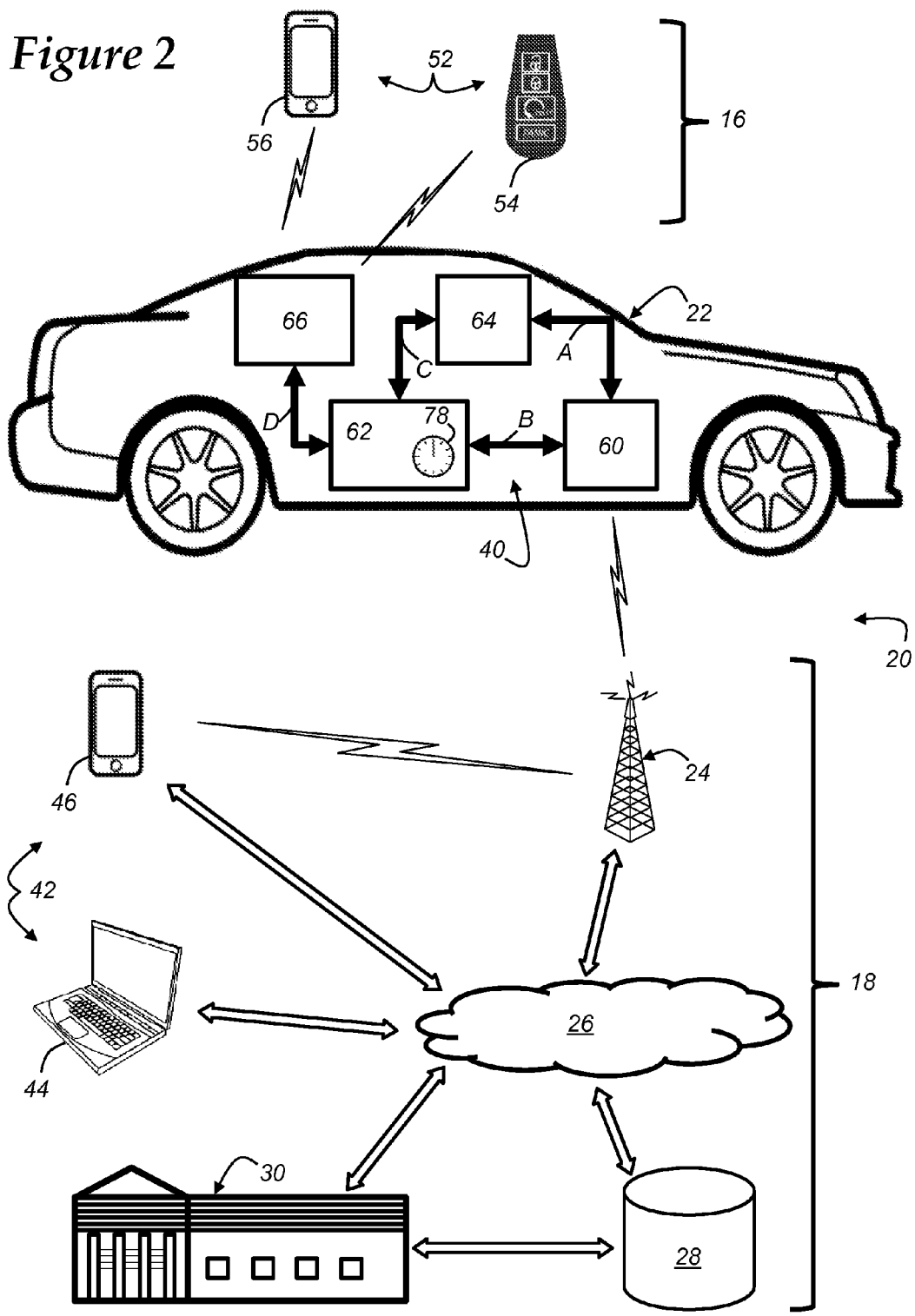
FIG. 2 is a block diagram depicting an embodiment of a communications system that is capable of utilizing the method disclosed herein.

FIG. 2 illustrates a mobile vehicle communications system 20 that can be used to implement the method(s) disclosed herein. Communications system 20 generally includes a vehicle 22, a mobile device 56 that has communication control privileges of vehicle 22, one or more wireless carrier systems 24, a land communications network 26, a remote server 28, and a call center 30. It should be understood that the disclosed method can be used with any number of different systems and is not specifically limited to the operating environment shown here.

The vehicle 22 is depicted in the illustrated embodiment as a passenger car having an integrated communication means 40 enabling multiple electronic subsystems to communicate with one another and perform, among other things, various vehicle functions. The communications means 40 may enable intra-vehicle communication, as well as communication with other parts of the system 20; the communication means 40 will be discussed in greater detail below. A passenger car is merely one implementation; the vehicle 22 can be any other type of vehicle including motorcycles, trucks, sports utility vehicles (SUVs), recreational vehicles (RVs), marine vessels, aircraft, etc.

Wireless carrier system 24 is preferably a cellular telephone system that includes a plurality of cell towers and may include any other suitable communication equipment (e.g., mobile switching centers (MSC), base transceiver stations (BTS), evolved node Bs (eNodeB or eNB), etc.; e.g., depending on the type of wireless communication or architecture). The communication equipment may include any other networking components required to connect wireless carrier system 24 with land network 26. Each cell tower may include sending and receiving antennas, the cell tower(s) being connected to the communication equipment either directly or via intermediary equipment. Cellular system 24 can implement any suitable communications technology, including for example, analog technologies such as AMPS, or the newer digital technologies such as CDMA (e.g., CDMA2000), GSM/GPRS, or LTE. As will be appreciated by those skilled in the art, various cell tower/communication equipment arrangements are possible and could be used with any type of wireless system 24.

Land network 26 may be a conventional land-based telecommunications network that is connected to one or more landline telephones and connects wireless carrier system 24 to call center 30. For example, land network 26 may include a public switched telephone network (PSTN) such as that used to provide hardwired telephony, packet-switched data communications, and the Internet infrastructure. One or more segments of land network 26 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 30 need not be connected via land network 26, but could include wireless telephony equipment so that it can communicate directly with a wireless network, such as wireless carrier system 24.

Remote server 28 can be one of a number of computing devices accessible via a private or public network such as the Internet. Each such server 28 can be used for one or more purposes, such as a web server accessible by the vehicle communication means 40 and wireless carrier 24. Other such accessible servers 28 can be, for example: a service center computer where diagnostic information and other vehicle data can be uploaded from the vehicle or a third party repository to or from which vehicle data or other information is provided, whether by communicating with the vehicle 22 or call center 30, or both. In one implementation, the server 28 is located at the call center 30.

Call center 30 is designed to provide the vehicle 22 with a number of different system back-end functions and generally includes one or more servers, databases, live advisors, etc. As the services that may be provided by vehicle call centers are well known in the art, call centers and their respective services will not be discussed in detail here.

The wireless carrier systems 24, the land communications network 26, the remote server(s) 28, and the call center 30 may be remotely located 18 from the vehicle 22. Other remotely located user interface devices 42 may be in communication with the carrier systems 24, network 26, server 28, etc. For example, devices 42 may include a computer or computing device 44 or another mobile device 46 associated with a user of vehicle 22. The computer 44 may be a client computer used by or associated with the vehicle owner or other subscriber for such purposes as accessing or receiving vehicle data, setting up or configuring vehicle or subscriber preferences, or both.

And the mobile device 46 may be any electronic device configured for communication over the wireless carrier system 24, the land network 26, etc. Further, the mobile device 46 include: hardware, software, and/or firmware enabling cellular telecommunications and communications via short-range wireless communication (e.g., Wi-Fi Direct and Bluetooth) as well as other mobile device applications. The hardware of the mobile device 46 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One implementation of a vehicle-mobile device application may enable a vehicle user to communicate with the vehicle 22 and/or control various aspects or functions of the vehicle—e.g., among other things, allowing the user to remotely lock/unlock vehicle doors, turn the vehicle On/Off, check the vehicle tire pressures, fuel level, oil life, etc. In addition, the application may also allow the user to connect with the call center 30 or call center advisors at any time.

The mobile device hardware also may include a display, a keypad (e.g., push button and/or touch screen), a microphone, one or more speakers, motion-detection sensors (such as accelerometers, gyroscopes, etc.), and a camera.

Non-limiting examples of the mobile device 46 include a cellular telephone, a personal digital assistant (PDA), a smart phone, a personal laptop computer or tablet computer having two-way communication capabilities, a netbook computer, a notebook computer, or any suitable combinations thereof.

Two additional devices 52 are shown locally or proximately located 16 with respect to vehicle 22 in FIG. 2 as well. Devices 52 include a keyfob 54 associated with vehicle 22 and the mobile device 56. The keyfob 54 may comprise a body that includes one or more switches or buttons for user interaction; further, the body may carry a processor, memory, and a wireless transmitter for short range wireless communication (SRWC, e.g., such as Bluetooth or Bluetooth Low Energy (BLE)). As will be appreciated by skilled artisans, the keyfob memory may store and transmit a cryptographic key used for keyfob validation at the vehicle. Following user actuation, transmission of a wireless signal that includes the cryptographic key may initiate or control one or more vehicle functions such as locking and unlocking doors, starting the vehicle, operating a vehicle alarm system, operating a vehicle trunk release, etc.

The mobile device 56 may have similar hardware, software, programming applications, etc. as that described with respect to mobile device 46; therefore, all of the features and functions will not be repeated here. In at least one embodiment, however, mobile device 56 has application software configured to remotely command vehicle functions. For example, mobile device 56 can command at least one of the following functions at the vehicle 22: electronically-activate the vehicle door locks, electronically-activate the vehicle's ignition, or an electronically-activate the vehicle's trunk release. More specifically, as will be described more below, mobile device 56 may be configured to operate the vehicle 22 without the use of a vehicle ignition key or keyfob 54.

FIG. 2 also illustrates various features of the communication means 40 in vehicle 22. The communication means 40 includes an embedded vehicle telematics unit (VTU) 60, a vehicle system module (VSM) 62, a vehicle head unit or vehicle multi-tainment unit (VMU) 64, and a SRWC base unit or module 66. The components are illustrated schematically having diagrammatic arrows showing connectivity (e.g., connections A, B, C, D); however, it should be appreciated that communication means 40 includes any suitable wired or wireless connection. Therefore, connections A, B, C, and/or D may include any suitable hardware, software, protocols, etc. For example, the connections may be part of a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. The connections also could include any suitable SRWC such as any suitable Wi-Fi standard (e.g., IEEE 802.11), Wi-Fi Direct, Bluetooth, wireless infrared transmission, or various combinations thereof.

The telematics unit 60 can be an OEM-installed (embedded) or aftermarket device that is installed in the vehicle and that enables wireless voice and/or data communication over wireless carrier system 24 and via wireless networking. It can be used to provide a diverse range of vehicle services that involve wireless communication to and/or from the vehicle including turn-by-turn directions, airbag deployment notification, emergency or roadside assistance-related services, as well as providing secure communications via a private APN and communication link with the vehicle call center 30. Wireless services may include cellular communication (e.g., GSM, CDMA, and/or LTE) and, in some instances, SRWC (e.g., Wi-Fi standard (e.g., IEEE 802.11), Wi-Fi Direct, Bluetooth, wireless infrared transmission, etc.).

The VSM 62 is representative of one of multiple programmable VSMs located throughout the vehicle that receive input from one or more sensors and use the sensed input to perform diagnostic, monitoring, control, reporting and/or other functions. For example, VSMs 62 may be connected by a communications bus to one another. In at least one embodiment, VSM 62 is a body control module (or BCM) or engine control module (ECM) connected to the SRWC module 66 via connection D and is capable of monitoring and controlling various electronic aspects of the vehicle 22 (e.g., vehicle ignition, or controlling power windows, power mirrors, air conditioning, power door locks, etc.). Other implementations also exist.

The vehicle head unit 64 may be any suitable human-machine interface device having hardware, software, etc. providing vehicle entertainment and vehicle infotainment services to the vehicle users and/or occupants. Hardware may include a display having touch screen input capability, switches, knobs, or any combination thereof suitable for receiving vehicle occupant interaction. The head unit 64 may be couplable to AM/FM/XM/Sirius™ radio tuner(s), as well as speakers and microphones suitable for user-voice control. In addition, the head unit may have memory and a processor configured to execute instructions stored on the memory including application software. Further, in some implementations, the head unit may have other features such as SRWC capability—e.g., for use with mobile device 56.

Figure 3:
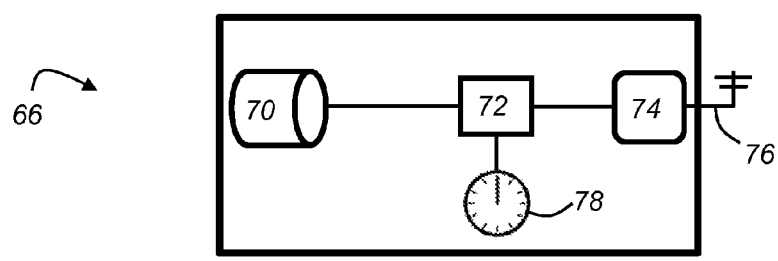
FIG. 3 is a schematic diagram of a short range wireless communication (SRWC) module.

The SRWC base unit or module 66 is also shown in FIG. 3. The module may include any circuitry or device configured to communicate with devices 52 inside of and outside of the vehicle 22 using a suitable form of short range wireless communication (SRWC). For example, the module 66 may include its own memory 70 and processor 72 as well as any SRWC transceiver circuitry 74 and associated antenna 76. The processor 72 may carry out instructions stored in memory 70 to validate the cryptographic key provided by the keyfob 54. SRWC used by the module 66 may be Bluetooth, Wi-Fi (802.11), Wi-Fi Direct, or Bluetooth Low Energy (BLE).

In some implementations, the module 66 includes a quantifier 78 that determines whether a threshold value stored in memory 70 is determined or reached. The quantifier 78 may be implemented in hardware or software and may versatilely measure values in relation to the threshold value in a passive revocation method, as will be discussed below. In one embodiment, the quantifier is a timer configured to countdown from a predetermined value to a threshold value. In another embodiment, the quantifier is a counter that counts up to a threshold value. In another embodiment, the quantifier may count a number of cycles of a vehicle-related event, e.g., counting to a threshold value. Vehicle-related events should be construed broadly; examples include counting the number of ignition cycles, door-open cycles, tire-rotation cycles, or odometer miles, etc. In another embodiment, the quantifier performs other mathematical operations or calculations using one or more timestamps which are recorded and stored in memory 70 when associated events occur (e.g., a timestamp may be recorded at each ignition cycle). This embodiment is illustrated further in method 500 below. The values and/or thresholds may be configured by the user, set by a vehicle manufacturer or service center, or some combination thereof.

Method—

Figure 4:
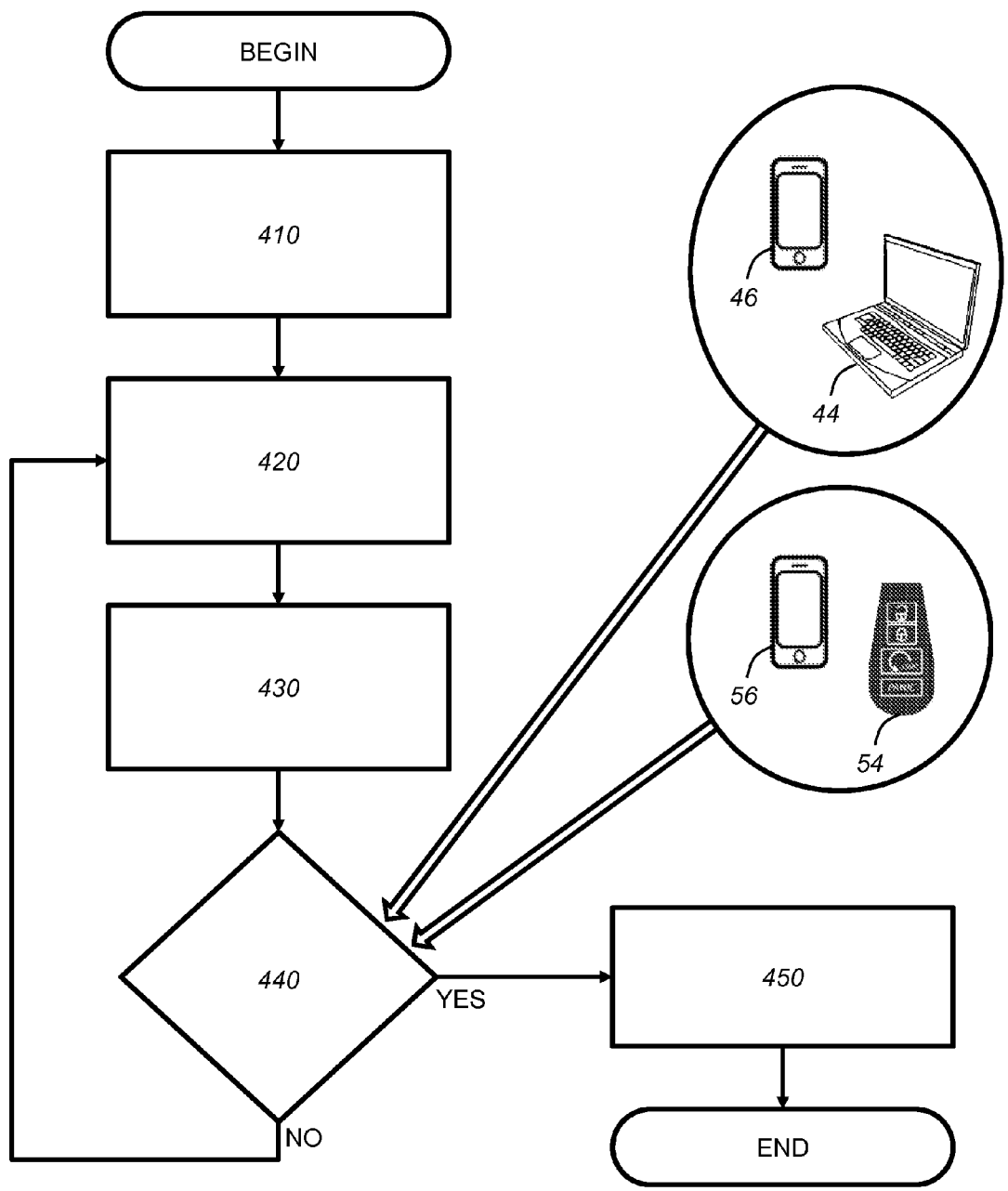
FIG. 4 is a flow diagram of a method of actively revoking communication control privileges of the mobile device.
Figure 5:
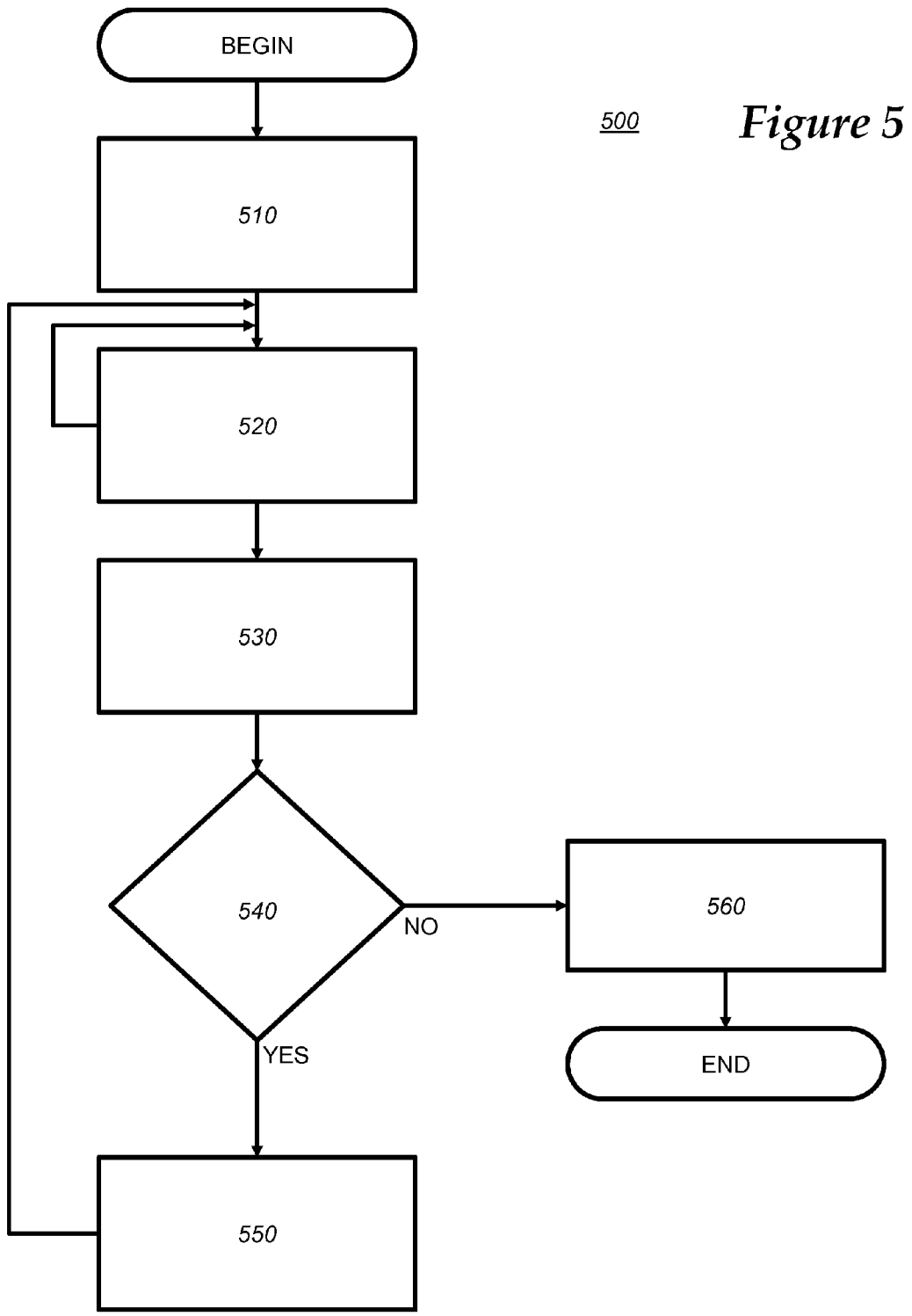
FIG. 5 is a flow diagram of a method of passively revoking communication control privileges of the mobile device.

FIG. 4 illustrates one embodiment of a method 400 of revoking communication control privileges from mobile device 56. The method begins with step 410 by assigning communication control privileges (CCP) to mobile device 56. CCP include the security credentials sufficient to enable a vehicle function command transmitted by the mobile device to be validated by the vehicle 22 upon receipt such that the vehicle then executes the vehicle function command. As discussed above, numerous vehicle function commands are possible; non-limiting examples of such commands include electronically-activating the vehicle door locks, electronically-activating the vehicle's ignition, or electronically-activating the vehicle's trunk release.

The assignment of CCP to mobile device 56 may occur in a variety of ways. For example, the call center 30 may determine that the mobile device is associated with the vehicle 22 and its owner and may provide the mobile phone 56 a shared, secret cryptographic key similar to that provided to the keyfob 54 (e.g., the SRWC module 66 may carry the corresponding shared key in memory 70). The assignment may be performed by the vehicle owner—e.g., retrieving a cryptographic key from the manufacturer via a secure web connection (e.g., via computer 44). The mobile device 56 may be assigned CCP for the vehicle 22 at a vehicle service center. These are merely a few examples. In at least one embodiment, the mobile device 56 includes application software configured to provide secure interaction with the vehicle 22.

In step 420, a vehicle function command is received from mobile device 56 requesting execution of at least one vehicle function. This command may be received a variety of ways. For example, in one implementation, the command is received and validated via the SRWC module 66 (e.g., via BLE); here, validation of the wireless command may be performed using known decryption techniques. The command may be received in other manners as well. By way of example, the command may be sent cellularly using the wireless carrier system 24, received by the call center 30 (or even the remote server 28), validated there, and then re-sent to vehicle 22 to be received by the telematics unit 60 via a private communication link, and ultimately received by the SRWC module 66. Other implementations also exist and are contemplated. Following step 420, the method proceeds to step 430.

In step 430, the method 400 carries out the vehicle command. For example, if the vehicle function command transmitted by the mobile device 56 was to unlock the electronically-actuated vehicle doors, then this command is carried out. This may include the SRWC module 66 communicating this command to the VSM 62, or the telematics unit 60 communicating this command thereto. Regardless, of the routing path within the communication means 40, the command is provided to the appropriate VSM—in at least one implementation, the BCM controls the vehicle door locks or trunk release. In another implementation, the engine control module (ECM) activates the vehicle's ignition. Following step 430, the method 400 may proceed to step 440.

In step 440, the vehicle 22 may determine whether an authorized revocation request has been received. A number of subsystems or components within the vehicle 22 may determine whether the revocation request is authorized; however, according to at least one implementation, the SRWC module 66 makes this determination. For example, module 66 may receive the request and based on credentials associated with the request, determine to revoke the CCP of mobile device 56.

The SRWC module 66 may receive the revocation request in a variety of ways. According to one embodiment, the revocation request is an active revocation and is received from a user interface device. Illustrated examples of the user interface device include the vehicle head unit 64, the keyfob 54, the mobile device 46, and the computer 44. For example, when the head unit receives input from a vehicle occupant, the input may comprise instructions to revoke the CCP of mobile device 56; and the vehicle head unit 64 may be able to communicate this to the SRWC module 66 via communication means 40 (e.g., a wired connection such as Ethernet).

In another embodiment, the keyfob 54 acts as the user interface device providing the revocation request wirelessly to the SRWC module 66. The request may be initiated by the vehicle user actuating switches on the keyfob according to a predetermined sequence. In response to this received sequence, the keyfob 54 may generate an electrical signal, which when received by the module 66, will indicate the desired revocation request.

In another embodiment, the computer 44 or mobile device 46 provides the revocation request to the telematics unit 60, the SRWC module 66, or the head unit 64. These revocation requests may utilize application software residing on the computer 44 or mobile device 46 or a web portal, just to name a couple examples. In addition, this embodiment may include routing of the request through the call center 30 or remote server 28, which in some instances may further validate the revocation request. Alternatively, when the revocation request is communicated via cellular communication, ultimately it may be received by the telematics unit 60 and provided to the SRWC module 66. When the revocation request is received at the vehicle 22 using some form of short range wireless communication, it may be received by the telematics unit 60 or head unit 64 and thereafter provided to the SRWC module 66. And in at least one implementation, mobile device 46 may also be configured to command vehicle functions—therefore, device 46 may be able to directly communicate with the SRWC module 66 (e.g., being located proximate to the vehicle 22). In all instances, the SRWC module 66 may receive from the user interface device the indication to revoke CCP of mobile device 56.

According to step 440, when the active revocation request has been received at the SRWC module 66, the method proceeds to step 450. When it is determined by the SRWC module 66 that no revocation request has been received, the method 400 may loop back to step 420—repeating steps 420, 430, and 440.

In step 450, the communication control privileges (CCP) are revoked. For example, the SRWC module may update a registry within its memory 70 so that future commands received from mobile device 56 are ignored. For example, any credentials or authorization setting(s) stored in memory 70 that are associated with mobile device 56 may be deleted or overwritten. Therefore, the mobile device 56 may be unable to start or unlock the vehicle 22; or, if the vehicle is currently running, the mobile device 56 may be unable to perform these actions subsequently (e.g., on the next attempt to start the vehicle). Thereafter, method 400 ends.

In another embodiment, a method 500 may be carried out according to a passive revocation request. The method begins at step 510 which may be similar to step 410, as described above; therefore, it will not be re-described here. Thereafter, the method may proceed to step 520.

In step 520, the method 500 may monitor for a trigger associated with a revocation test event from within the vehicle 22—e.g., the trigger may be provided from the VSM 62, e.g., when the quantifier 78 determines a threshold value. The BCM (a VSM) may send an indication (e.g., an electrical signal) to the SRWC module 66 indicative of the trigger. In response to the trigger, the vehicle user may be presented a query, as discussed in step 530.

The threshold value may be associated with a predetermined or preassigned value at the quantifier 78. As described above, the quantifier 78 may be a timer, a counter, or perform various mathematical calculations using timestamps—being capable of quantifying threshold values (e.g., including durations). To illustrate, where the quantifier is configured as a timer (counting down) from a predetermined value (e.g., such as 24 hours), then the threshold value may be zero (or other value less than the predetermined value). Therefore, for example, the trigger may occur when the timer reaches zero. Or where the quantifier is configured as a counter (counting up to a threshold value, e.g., from zero), then the threshold value may be 24 hours, 48 hours, etc. Therefore, the trigger occurs when the counter reaches 24 hours, 48 hours, etc. Or, in another example, the quantifier may be configured to perform a calculation—e.g., determining the difference between two timestamps and comparing that difference to a threshold value. For example, when a vehicle function is executed using mobile device 56, a first timestamp is recorded (timestamp1). When the next vehicle function is executed using mobile device 56, a second timestamp is recorded (timestamp2). The quantifier 78 may determine the difference between the timestamps (timestamp2−timestamp1) and then compare that to a threshold value. For example, a trigger may be sent from the SRWC module 66 when timestamp2−timestamp1>threshold value. Once the trigger is received by the SRWC module 66, the method proceeds to step 530.

In step 530, the vehicle presents to the user a query requesting an authentication code (e.g., a password, PIN, a biometric input, etc.). The vehicle may present this query to the user via any suitable user interface device (e.g., via mobile phone 56, via the head unit 64, via a remote device such as mobile device 46 or computer 44, etc.). According to one illustrative embodiment therefore, the SRWC module 66 transmits a wireless signal to mobile device 56, and the mobile device 56 uses vehicle application software to display this query to the user.

Step 540 represents a revocation test event—i.e., an event which may result in revocation of CCP of mobile device 56 or may not, depending on the user's input to the mobile device 56. Step 540 determines if the authentication code is received in response to the query. This may occur, e.g., at the SRWC module 66—comparing the user-provided authentication code to a code stored in memory 70. Continuing with the example, if in response to user input, the mobile device 56 provides an accurate response (i.e., the correct authentication code), the method proceeds to step 550. However, if the correct authentication code is not received (e.g., if the received code is inaccurate or not received after a predetermined period of time), then the method proceeds to step 560.

In step 560, the method 500 performs a step similar to that of step 450 (in method 400) and the CCP of mobile device 56 are revoked. And the method thereafter ends.

In step 550, the quantifier 78 is reset. For example, if the quantifier is configured as a timer, the quantifier begins counting down again to zero (or any other preconfigured value). Or if the quantifier is configured as a counter, the quantifier begins counting up again from zero (or any other preconfigured value). Thereafter, the method proceeds again to step 520—awaiting the next trigger. And steps 520, 530, and 540 may be repeated.

In implementations where the quantifier performs mathematical calculations, the resetting step 550 may disregard timestamp1 and be ready to calculate a new difference between timestamp2 and a future timestamp (e.g., timestamp3). Of course, it will be appreciated that timestamp3 may occur when the vehicle user performs the same remote vehicle function using mobile device 56. Thus, in step 520, the trigger may next occur when timestamp3−timestamp2>threshold value. It should be appreciated that numerous timestamps may occur without causing a trigger to occur; when for example, timestamp3−timestamp2 is not greater than the threshold value. In these instances, the older timestamp may be disregarded and the two newer timestamps may be used in the next mathematical evaluation (e.g., during the monitoring step 520).

Other implementations also exist. For example, one of the VSMs 62 may store in vehicle memory (VSM memory) driving parameters associated with the driving patterns or characteristics of the authorized vehicle user—e.g., past or former driving characteristics. The VSM 62 may monitor current or real-time driving characteristics of the current driver. Based on an assessment or determination of the former characteristics compared to the current driving characteristics, the VSM 62 may determine that the current driver may not be authorized to use the vehicle, or at least that the possibility exists. In response to such an assessment, the VSM may send a trigger to the SRWC module 66 which may send a query requesting the authentication code.

Or for example, in response to such an assessment, the VSM 62 may otherwise limit vehicle functionality. For example, the VSM 62 may control or direct the governing of vehicle functions according to a predetermined user-profile (e.g., a teenager-driving mode that limits head unit volume, driving speed, etc.). In some implementations, both the authentication code is requested and the predetermined user-profile is actuated.

In at least one implementation, both the passive and active revocation methods discussed above may be operative simultaneously. For example, the vehicle 22 may be configured to receive active revocations while simultaneously reviewing triggering events and requesting the vehicle user to periodically provide an authentication code.

Thus, there has been described a communication system and methods for revoking communication control privileges (CCP). The revocation may be active or passive. Active methods may require the user to provide some input to a user interface device, such as the vehicle head unit. Passive methods may perform revocation when no user input is provided—or more specifically, when incorrect authentication information is provided. In such circumstances, a criminal who has stolen the vehicle may be inhibited from entering, starting, etc. the vehicle.

The methods described above may be performed as one or more computer programs executable by one or more computing devices of or in communication with various vehicle components such as the telematics unit 60, the VSM 62 (e.g., the BCM), the vehicle head unit 64, and/or the SRWC module 66. The memory associated with each of these devices (and other similarly described devices in the vehicle 22) may store different or common computer programs. In each of these instances, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. In addition, each of the processors described above may operate their respective unit or module causing the system and/or the computing device(s) to perform the method. It is therefore to be understood that the methods may be at least partially performed by any electronic device(s) capable of executing the above-described functions.

Memory may be any suitable non-transitory computer usable or readable medium. Exemplary computer usable storage devices include conventional computer system RAM (random access memory), ROM (read only memory), EPROM (erasable, programmable ROM), EEPROM (electrically erasable, programmable ROM), and magnetic or optical disks or tapes.

Memory may store one or more computer programs executable by the processor(s) to cause the communication system to perform the methods described herein. Computer program(s) may exist in a variety of forms—both active and inactive. For example, the computer program(s) can exist as software program(s) comprised of program instructions in source code, object code, executable code or other formats; firmware program(s); or hardware description language (HDL) files.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of revoking communication control privileges of a mobile device previously authorized to control a vehicle, comprising the steps of:
   receiving a revocation request at a short range wireless communication (SRWC) module in the vehicle from a user interface device, the revocation request comprising a request to revoke the communication control privileges of the previously authorized mobile device, wherein the control privileges include a capacity to remotely command at least one of a plurality of vehicle functions and are enabled by assignment of security credentials established through an authentication of a key shared exclusively between the authorized mobile device and the SRWC module, wherein the user interface device includes one of a vehicle multi-tainment unit (VMU) within the vehicle or a keyfob associated with the vehicle; and
   based on the revocation request, revoking at the vehicle the communication control privileges of the previously authorized mobile device.

2. The method of claim 1, wherein, prior to receiving the revocation request, the method further comprises:
   operating electronic subsystems in the vehicle that each control at least one of the plurality of vehicle functions, wherein the plurality of vehicle functions include at least one or more of the following: electronically-activated door locks, electronically-activated vehicle ignition, and an electronically-activated trunk release;
   providing the mobile device with communication control privileges;
   following the providing step, receiving a command from the mobile device to perform one of the plurality of vehicle functions; and
   carrying out the vehicle function based on the command.

3. The method of claim 1, wherein the receiving step further comprises:
   receiving the revocation request at the SRWC module via a short range wireless communication (SRWC) link between the SRWC module and the keyfob, or
   receiving the revocation request at the SRWC module via a connection between the SRWC module and the VMU.

4. The method of claim 1, wherein the revocation request is received at the vehicle from the user interface device via a Bluetooth Low Energy (BLE) protocol.

5. The method of claim 1, wherein the at least one of a plurality of vehicle functions includes a vehicle security function that includes a capability to actuate electronically-activated vehicle door locks, an electronically-activated vehicle ignition, an electronically-activated trunk release, or any combination thereof.

6. A method of revoking communication control privileges of a mobile device previously authorized to control a vehicle, comprising the steps of:
   enabling the communication control privileges by assignment of security credentials established through an authentication of a key shared exclusively between the authorized mobile device and the vehicle;
   monitoring for receipt of a trigger associated with a revocation test event, wherein the trigger is in response to a quantifier in the vehicle determining a threshold value;
   when the trigger is received, presenting a query to a vehicle user via a user interface device, the query requesting an authentication code; and
   when the authentication code is not received, then revoking the communication control privileges of the mobile device.

7. The method of claim 6, wherein the communication control privileges of the mobile device include includes a capability to actuate electronically-activated vehicle door locks, an electronically-activated vehicle ignition, an electronically-activated trunk release, or any combination thereof.

8. The method of claim 6, wherein the user interface device includes one of the previously authorized mobile phone or a vehicle multi-tainment unit (VMU).

9. The method of claim 8, further comprising:
   after receiving the authentication code, resetting the quantifier; and repeating the monitoring and presenting steps, and when the authentication code is not received, then revoking the communication control privileges of the mobile device.

10. The method of claim 6, further comprising:
storing in vehicle memory former driving parameters associated with driving characteristics of an authorized vehicle user;
monitoring current driving parameters;
determining that a current driver of the vehicle may not be authorized to use the vehicle based on an assessment of the former driving parameters and the current driving parameters; and
prior to receiving the trigger, determining at the vehicle that the current driver is not authorized to use the vehicle; and
based on this determination, limiting vehicle functionality.

11. The method of claim 10, wherein limiting vehicle functionality includes:
(a) governing vehicle functions according to a predetermined user-profile;
(b) triggering the query requesting the authentication code even if the expiration has not occurred and revoking the communication control privileges of the mobile device if the authentication code is not received; or
(c) performing both (a) and (b).

12. A method of revoking vehicle communication control privileges of a mobile device, comprising the steps of:
operating electronic subsystems in a vehicle that each control at least one of a plurality of vehicle functions, wherein the plurality of vehicle functions include at least one or more of the following: electronically-activated door locks, electronically-activated vehicle ignition, and an electronically-activated trunk release;
receiving, at the vehicle directly from a mobile device, a vehicle function command from the mobile device while the mobile device is present at the vehicle, wherein the vehicle function command comprises a request for the vehicle to carry out one of the vehicle functions, and wherein the vehicle includes an authorization setting indicating that the mobile device is authorized to command the vehicle to carry out one or more of the plurality of vehicle functions including the requested vehicle function, wherein the authorization setting includes security credentials established through an authentication of a key shared exclusively between the mobile device and the vehicle;
carrying out the requested vehicle function; and then subsequently:
receiving at the vehicle a revocation request indicating that the mobile device is no longer authorized to carry out the one or more vehicle functions; and
in response to receipt of the revocation request, changing the authorization setting in the vehicle so that the mobile device is no longer authorized to command the vehicle to carry out the one or more vehicle functions,
wherein the step of receiving the revocation request further comprises receiving the revocation request from one of the following: a vehicle keyfob, a vehicle multi-tainment unit (VMU) within the vehicle, or a computer that is in cellular communication with a telematics unit in the vehicle, wherein the computer is remotely located with respect to the vehicle.

13. The method of claim 12, wherein the revocation request received from the vehicle keyfob is an electrical signal corresponding to a predetermined sequence of keyfob switch actuations.

* * * * *